United States Patent
Pedicini et al.

(10) Patent No.: US 6,322,913 B2
(45) Date of Patent: *Nov. 27, 2001

(54) AIR MANAGER CONTROL USING CELL LOAD CHARACTERISTICS AS AUTO-REFERENCE

(75) Inventors: Christopher S. Pedicini, Roswell; Gary E. Gray, Marietta; Wayne Kurle, Winston, all of GA (US)

(73) Assignee: AER Energy Resources, Inc., Smyrna, GA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/275,855

(22) Filed: Mar. 24, 1999

Related U.S. Application Data

(63) Continuation-in-part of application No. 08/936,206, filed on Sep. 24, 1997, now Pat. No. 6,106,962.

(51) Int. Cl.[7] ................................................ H01M 12/06
(52) U.S. Cl. .............................. 429/13; 429/23; 429/27
(58) Field of Search ................................ 429/13, 23, 27, 429/83

(56) References Cited

U.S. PATENT DOCUMENTS

| 737,613 | 9/1903 | Halsey . |
|---|---|---|
| 1,112,861 | 10/1914 | Snyder . |
| 1,285,659 | 11/1918 | Ford . |

(List continued on next page.)

FOREIGN PATENT DOCUMENTS

| 32 39 396 | 10/1982 | (DK) . |
|---|---|---|
| 0 044 060 | 1/1981 | (EP) . |
| 0 265 242 | 10/1987 | (EP) . |
| 0 293 007 | 11/1988 | (EP) . |
| 0 294 327 | 12/1988 | (EP) . |
| 0 341 189 | 11/1989 | (EP) . |
| 0 417 324 | 3/1991 | (EP) . |
| 0 476 848A2 | 9/1991 | (EP) . |
| 1.575.640 | 6/1969 | (FR) . |
| 2 353 142 | 12/1977 | (FR) . |
| 1176488 | 1/1970 | (GB) . |
| 48 27096 | 8/1973 | (JP) . |
| 59 134570 | 8/1984 | (JP) . |
| 60091569 | 5/1985 | (JP) . |
| 63-110558 | 5/1988 | (JP) . |
| 434 5773 | 1/1992 | (JP) . |
| 50 40773 | 12/1995 | (JP) . |
| WO 90/11625 | 10/1990 | (WO) . |
| WO 93/18556 | 9/1993 | (WO) . |
| WO 93/19495 | 9/1993 | (WO) . |
| WO 94/02966 | 2/1994 | (WO) . |
| WO 94/08358 | 4/1994 | (WO) . |
| WO 94/25991 | 11/1994 | (WO) . |

OTHER PUBLICATIONS

The Search for Better Batteries, IEEE Spectrum May 1995.

Microprocessor Voltage Monitors with Programmable Voltage Detection, Maxim 1995.

*Primary Examiner*—Stephen Kalafut
(74) *Attorney, Agent, or Firm*—Alston & Bird LLP

(57) ABSTRACT

A metal-air battery with an air moving device controller to determine when a load is present on the battery and the extent of that load is described. The air moving device controller allows the operation of the air moving device for the battery to be responsive to the load. Advantageously, the controller allows the metal-air battery to limit the intake of oxygen and other gases to that amount needed to drive the load.

30 Claims, 6 Drawing Sheets

U.S. PATENT DOCUMENTS

| | | | |
|---|---|---|---|
| 1,363,889 | 12/1920 | Linebarger . | |
| 2,273,244 | 2/1942 | Ambruster . | |
| 2,275,281 | 3/1942 | Berl . | |
| 2,468,430 | 4/1949 | Derksen . | |
| 2,687,448 | 8/1954 | Gulick . | |
| 2,759,038 | 8/1956 | Marsal . | |
| 2,907,809 | 10/1959 | Southworth . | |
| 3,072,284 | 1/1963 | Luhman | 220/44 |
| 3,160,528 | 12/1964 | Dengler . | |
| 3,288,644 | 11/1966 | Delfino . | |
| 3,372,060 | 3/1968 | Platner . | |
| 3,382,238 | 5/1968 | Dolfini | 260/239.1 |
| 3,395,047 | 7/1968 | Terry . | |
| 3,411,951 | 11/1968 | Gelting . | |
| 3,436,270 | 4/1969 | Oswin . | |
| 3,457,155 | 7/1969 | Kent . | |
| 3,473,963 | 10/1969 | Sanderson . | |
| 3,523,830 | 8/1970 | Baker . | |
| 3,532,548 | 10/1970 | Stachurski . | |
| 3,533,846 | 10/1970 | Rogers . | |
| 3,551,208 | 12/1970 | Stachurski . | |
| 3,553,029 | 1/1971 | Kordesch et al. . | |
| 3,554,810 | 1/1971 | Zaromb . | |
| 3,576,667 | 4/1971 | Keathing et al. . | |
| 3,600,233 | 8/1971 | Coffey et al. . | |
| 3,607,423 | 9/1971 | Bertioli . | |
| 3,615,839 | 10/1971 | Thompson . | |
| 3,615,860 | 10/1971 | Teriecke . | |
| 3,629,009 | 12/1971 | Bennett . | |
| 3,666,562 | 5/1972 | Sprengel . | |
| 3,740,636 | 6/1973 | Hogrefe et al. | 320/2 |
| 3,744,516 | 7/1973 | Rowe . | |
| 3,801,372 | 4/1974 | Shaw . | |
| 3,850,695 | 11/1974 | Keller et al. . | |
| 3,871,920 | 3/1975 | Grebier et al. . | |
| 3,898,548 | 8/1975 | Peralle et al. . | |
| 3,904,441 | 9/1975 | Badger . | |
| 3,909,302 | 9/1975 | Mermelstein . | |
| 3,963,519 | 6/1976 | Louie . | |
| 3,975,210 | 8/1976 | Warnock . | |
| 3,977,901 | 8/1976 | Buzzelli . | |
| 3,994,748 | 11/1976 | Kunz et al. . | |
| 4,002,496 | 1/1977 | Nitta et al. | 429/53 |
| 4,054,725 | 10/1977 | Tuburaya | 429/29 |
| 4,098,964 | 7/1978 | Reber | 429/86 |
| 4,105,830 | 8/1978 | Kordesch et al. . | |
| 4,112,198 | 9/1978 | Przybyla et al. | 429/27 |
| 4,112,199 | 9/1978 | Dunlop et al. | 429/2 |
| 4,118,544 | 10/1978 | Przybyla et al. | 429/27 |
| 4,139,846 | 2/1979 | Conforti | 340/636 |
| 4,152,489 | 5/1979 | Chottiner | 429/27 |
| 4,177,327 | 12/1979 | Matthews et al. | 429/27 |
| 4,189,526 | 2/1980 | Cretzmeyer et al. | 429/13 |
| 4,207,514 | 6/1980 | Klein | 320/44 |
| 4,221,644 | 9/1980 | La Barre . | |
| 4,246,324 | 1/1981 | de Nora et al. | 429/17 |
| 4,262,062 | 4/1981 | Zatsky | 429/27 |
| 4,279,970 | 7/1981 | Breault et al. | 429/35 |
| 4,298,666 | 11/1981 | Taskier | 429/206 |
| 4,310,604 | 1/1982 | Marchetti | 429/17 |
| 4,316,185 | 2/1982 | Watrous et al. | 340/636 |
| 4,318,092 | 3/1982 | Cowles et al. | 340/636 |
| 4,352,067 | 9/1982 | Ottone | 324/434 |
| 4,359,510 | 11/1982 | Taskier | 429/144 |
| 4,364,805 | 12/1982 | Rogers | 204/98 |
| 4,369,235 | 1/1983 | Bursell | 429/27 |
| 4,399,200 | 8/1983 | Galloway | 429/23 |
| 4,448,858 | 5/1984 | Graf et al. | 429/49 |
| 4,484,691 | 11/1984 | Lees | 220/89 |
| 4,490,443 | 12/1984 | Ruch et al. | 429/27 |
| 4,493,880 | 1/1985 | Lund | 429/97 |
| 4,521,497 | 6/1985 | Tamminen | 429/27 |
| 4,588,660 | 5/1986 | Shimizu et al. | 429/35 |
| 4,588,661 | 5/1986 | Kaufman et al. | 429/36 |
| 4,620,111 | 10/1986 | McArthur et al. | 307/150 |
| 4,626,482 | 12/1986 | Hamlen et al. | 429/27 |
| 4,642,733 | 2/1987 | Sasaki | 429/22 |
| 4,687,714 | 8/1987 | Oltman et al. | 429/27 |
| 4,693,946 | 9/1987 | Niksa et al. . | |
| 4,729,930 | 3/1988 | Beal et al. | 429/13 |
| 4,738,905 | 4/1988 | Collins | 429/36 |
| 4,745,038 | 5/1988 | Brown | 429/27 |
| 4,756,980 | 7/1988 | Niksa et al. | 429/27 |
| 4,828,939 | 5/1989 | Turley et al. | 429/38 |
| 4,842,963 | 6/1989 | Ross, Jr. | 429/21 |
| 4,857,885 | 8/1989 | Umerez | 340/321 |
| 4,859,545 | 8/1989 | Scheffler et al. | 429/17 |
| 4,871,627 | 10/1989 | Strong et al. | 429/27 |
| 4,885,217 | 12/1989 | Hoge | 429/27 |
| 4,885,218 | 12/1989 | Andou et al. | 429/53 |
| 4,894,295 | 1/1990 | Cheiky | 429/77 |
| 4,904,548 | 2/1990 | Tajima | 429/22 |
| 4,908,281 | 3/1990 | O'Callaghan | 429/27 |
| 4,911,993 | 3/1990 | Turley et al. | 429/27 |
| 4,913,983 | 4/1990 | Cheiky | 429/13 |
| 4,927,717 | 5/1990 | Turley et al. | 429/27 |
| 4,929,931 | 5/1990 | McCuen | 340/636 |
| 4,950,561 | 8/1990 | Niksa et al. | 429/27 |
| 4,957,826 | 9/1990 | Cheiky | 429/27 |
| 5,024,904 | 6/1991 | Curiel | 429/27 |
| 5,047,961 | 9/1991 | Simonsen | 364/550 |
| 5,069,986 | 12/1991 | Dworkin et al. . | |
| 5,084,364 | 1/1992 | Quaadvliet | 429/34 |
| 5,093,213 | 3/1992 | O'Callaghan | 429/27 |
| 5,156,925 | 10/1992 | Lapp | 429/19 |
| 5,170,124 | 12/1992 | Blair et al. | 324/434 |
| 5,183,222 | 2/1993 | Ramsey, Jr. | 244/53 |
| 5,187,746 | 2/1993 | Narisawa | 381/68.7 |
| 5,191,274 | 3/1993 | Lloyd et al. | 320/2 |
| 5,196,275 | 3/1993 | Goldman et al. | 429/27 |
| 5,208,526 | 5/1993 | Goldman et al. | 320/2 |
| 5,258,239 | 11/1993 | Kobayashi . | |
| 5,260,144 | 11/1993 | O'Callaghan | 429/14 |
| 5,304,431 | 4/1994 | Schumm, Jr. | 429/27 |
| 5,306,579 | 4/1994 | Shepard, Jr. et al. | 429/40 |
| 5,318,861 | 6/1994 | Harats et al. | 429/21 |
| 5,328,777 | 7/1994 | Bentz et al. | 429/27 |
| 5,328,778 | 7/1994 | Woodruff et al. | 429/27 |
| 5,343,137 | 8/1994 | Kitaoka et al. | 320/13 |
| 5,354,625 | 10/1994 | Bentz et al. | 429/17 |
| 5,356,729 | 10/1994 | Pedicini . | |
| 5,362,577 | 11/1994 | Pedicini | 429/17 |
| 5,366,822 | 11/1994 | Korall et al. | 429/27 |
| 5,387,477 | 2/1995 | Cheiky | 429/26 |
| 5,418,080 | 5/1995 | Korall et al. | 429/27 |
| 5,434,016 * | 7/1995 | Bentz et al. | 429/23 X |
| 5,439,758 * | 8/1995 | Stone et al. | 429/23 X |
| 5,447,805 | 9/1995 | Harats et al. | 429/27 |
| 5,506,067 | 4/1996 | Tinker | 429/27 |
| 5,536,590 | 7/1996 | Cheiky | 429/7 |
| 5,554,452 | 9/1996 | Delmolino et al. | 429/10 |
| 5,560,999 | 10/1996 | Pedicini et al. | 429/27 |
| 5,563,004 * | 10/1996 | Buzzelli et al. | 429/27 |
| 5,571,630 | 11/1996 | Cheiky | 429/26 |
| 5,678,647 | 10/1997 | Wolfe et al. | 180/65.3 |
| 5,691,074 * | 11/1997 | Pedecini | 429/27 |
| 5,712,052 | 1/1998 | Kawatsu | 429/13 |
| 5,721,064 | 2/1998 | Pedicini | 429/27 |
| 5,753,384 | 5/1998 | Kimberg | 429/27 |
| 5,853,910 | 12/1998 | Tomioka et al. | 429/17 |

* cited by examiner

AIR MANAGER CONTROL USING CELL LOAD CHARACTERISTICS AS AUTO-REFERENCE

RELATED APPLICATIONS

The present application is a continuation in part of application Ser. No. 08/936,206, filed Sep. 24, 1997, now U.S. Pat. No. 6,106,962.

TECHNICAL FIELD

The present invention relates generally to a battery for electrical power, and more particularly relates to an air-manager system for a metal-air battery.

BACKGROUND OF THE INVENTION

Metal-air battery cells include an air permeable cathode and an anode separated by an aqueous electrolyte. During discharge of a metal-air battery, such as a zinc-air battery, oxygen from the ambient air is converted at the cathode to hydroxide, zinc is oxidized at the anode by the hydroxide, and water and electrons are released to provide electrical energy. Metal-air batteries have a relatively high energy density because the cathode utilizes oxygen from the ambient air as a reactant in the electrochemical reaction, rather than a heavier material such as a metal or a metallic composition. Metal-air battery cells are often arranged in multiple cell battery packs within a common housing to provide a sufficient power output.

A steady supply of oxygen to the air cathodes is necessary to operate the metal-air battery. Some prior systems sweep a continuous flow of new ambient air across the air cathodes at a flow rate sufficient to achieve the desired power output. Such an arrangement is shown in U.S. Pat. No. 4,913,983 to Cheiky. Cheiky uses a fan within the battery housing to supply a predetermined flow of ambient air to a pack of metal-air battery cells. Before the battery is turned on, a mechanical air inlet door and an air outlet door are opened and the fan is activated to create the flow of air into, through, and out of the housing. After operation of the battery is complete, the air doors are sealed. The remaining oxygen in the housing slowly discharges the anode until the remaining oxygen is substantially depleted. The residual low power remaining in the cells is disclosed as being sufficient to restart the fan the next time the battery is used.

To ensure that a sufficient amount of oxygen is swept into the housing during use, Cheiky discloses a fan control means with a microprocessor to vary the speed of the fan according to pre-determined power output requirements. The greater the power requirement for the particular operation, the greater the fan speed and the greater the airflow across the battery cells. Several predetermined fan speeds are disclosed according to several predetermined power levels of the load. The disclosed load is a computer. The fan speed is therefore varied according to the power requirements of the various functions of the computer. Conversely, many other known air manager systems run the fan continuously when a load is applied.

In addition to the need for a sufficient amount of oxygen, another concern with metal-air batteries is the admission or loss of too much oxygen or other gasses through the housing. For example, one problem with a metal-air battery is that the ambient humidity level can cause the battery to fail. Equilibrium vapor pressure of the metal-air battery results in an equilibrium relative humidity that is typically about 45 percent. If the ambient humidity is greater than the equilibrium humidity within the battery housing, the battery will absorb water from the air through the cathode and fail due to a condition called flooding. Flooding may cause the battery to leak. If the ambient humidity is less than the equilibrium humidity within the battery housing, the metal-air battery will release water vapor from the electrolyte through the air cathode and fail due to drying out. The art, therefore, has recognized that an ambient air humidity level differing from the humidity level within the battery housing will create a net transfer of water into or out of the battery. These problems are particularly of concern when the battery is not in use, because the humidity tends to either seep into or out of the battery housing over an extended period of time.

Another problem associated with metal-air batteries is the transfer of carbon dioxide or other contaminates from the ambient air into the battery cell. Carbon dioxide tends to neutralize the electrolyte, such as potassium hydroxide. In the past, carbon dioxide absorbing layers have been placed against the exterior cathode surface to trap carbon dioxide. An example of such a system is shown in U.S. Pat. No. 4,054,725.

Maintaining a battery cell with proper levels of humidity and excluding carbon dioxide has generally required a sealed battery housing. As discussed above, prior art systems such as that disclosed by Cheiky have used a fan of some sort to force ambient air through large openings in the battery housing during use and a sealed air door during non-use. If the air door is not present or not shut during non-use, however, large amounts of ambient air will seep into the housing. This flow of air would cause the humidity and carbon dioxide problems within the housing as discussed above.

The assignee of the present invention is also the owner of U.S. Pat. No. 5,691,074, entitled "Diffusion Controlled Air Door," and application Ser. No. 08/556,613, entitled "Diffusion Controlled Air Vent and Recirculation Air Manager for a Metal-Air Battery," filed Nov. 13, 1995, now U.S. Pat. No. 5,919,582. These references disclose several preferred metal-air battery packs for use with the present invention and are incorporated herein by reference. The air inlet and outlet openings in the housing are sized with a length in the direction through the thickness of the housing being greater than a width in the direction perpendicular to the thickness of the housing.

For example, the references disclose, in one embodiment, a group of metal-air cells isolated from the ambient air except for an inlet and an outlet passageway. These passageways may be, for example, elongate tubes. An air-moving device positioned within the housing forces air through the inlet and outlet passageways to circulate the air across the oxygen electrodes and to refresh the circulating air with ambient air. The passageways are sized to allow sufficient airflow therethrough while the air mover is operating but also to restrict the passage of water vapor therethrough while the passageways are unsealed and the air mover is not operating.

When the air mover is off and the humidity level within the cell is relatively constant, only a very limited amount of air diffuses through the passageways. The water vapor within the cell protects the oxygen electrodes from exposure to oxygen. The oxygen electrodes are sufficiently isolated from the ambient air by the water vapor such that the cells have a long "shelf life" without sealing the passageways with a mechanical air door. These passageways may be referred to as "diffusion tubes", "isolating passageways", or "diffusion limiting passageways" due to their isolating capabilities. The isolating passageways also act to minimize the detrimental impact of humidity on the metal-air cells, especially while the air-moving device is off.

The efficiency of the isolating passageways in terms of the transfer of air and water into and out of a metal-air cell can be described in terms of an "isolation ratio." The "isolation ratio" is the rate of the water loss or gain by the cell while its oxygen electrodes are fully exposed to the ambient air as compared to the rate of water loss or gain by a cell while its oxygen electrodes are isolated from the ambient air except through one or more limited openings. For example, given identical metal-air cells having electrolyte solutions of approximately thirty-five percent (35%) KOH in water, an internal relative humidity of approximately fifty percent (50%), ambient air having a relative humidity of approximately ten percent (10%), and no fan-forced circulation, the water loss from a cell having an oxygen electrode fully exposed to the ambient air should be more than 100 times greater than the water loss from a cell having an oxygen electrode that is isolated from the ambient air except through one or more isolating passageways of the type described above. In this example, an isolation ratio of more than 100 to 1 should be obtained.

In accordance with the above-referenced example from U.S. Pat. No. 5,691,074, the isolating passageways function to limit the amount of oxygen that can reach the oxygen electrodes when the fan is off and the internal humidity level is relatively constant. This isolation minimizes the self-discharge and leakage or drain current of the metal-air cells. Self-discharge can be characterized as a chemical reaction within a metal-air cell that does not provide a usable electric current. Self-discharge diminishes the capacity of the metal-air cell for providing a usable electric current. Self-discharge occurs, for example, when a metal-air cell dries out and the zinc anode of oxidized by the oxygen that seeps into the cell during periods of non-use. Leakage current, which is synonymous with drain current, can be characterized as the electric current that can be supplied to a closed circuit by a metal-air cell when air is not provided to the cell by an air moving device. The isolating passageways as described above may limit the drain current to an amount smaller than the output current by a factor of at least fifty (50) times.

The use of the open air door battery housings described herein therefore simplifies the design of the battery as a whole and simplifies the use of the battery. In fact, these battery-housing designs allow the metal-air battery to act more like a conventional battery, i.e., the battery is available for the given load without any additional activity such as opening the air doors. The only requirement of these designs is that the fan or other air movement device must be turned on to provide a sufficient flow of oxygen for the cells.

In sum, the desired metal-air battery would be used in an identical manner to a conventional battery in that all the user needs to do is attach and activate the load. The battery itself would need no separate activation. Further, such a battery would have an energy efficient and quiet air manager system.

SUMMARY OF THE INVENTION

The present invention is directed towards a metal-air battery with an air moving device controller to determine when a load is present on the battery and the extent of that load. The air moving device controller allows the operation of the air-moving device for the battery to be responsive to the load. Advantageously, the controller allows the metal-air battery to limit the intake of oxygen and other gases to that amount needed to drive the load.

One embodiment of the present invention includes a metal-air battery with at least one metal-air cell isolated from ambient air except through at least one passageway. The battery further includes an air moving device operative to move air through the passageway to provide reactant air to the metal-air cell. The passageway is operative, while unsealed and while the air moving device is inactive, to restrict airflow through the passageway. The battery further includes an air moving device controller. The air moving device controller includes means for determining whether a load is on the metal-air battery and the extent of the load such that the operation of the air-moving device is responsive to the air moving device controller.

The means for determining whether a load is on the metal-air battery and the extent of the load includes a power sensor to monitor the voltage across the metal-air cell. The air moving device controller turns the air-moving device on when the voltage across the metal-air cell, as measured by said power sensor, is less than or equal to a predetermined voltage. The air moving device controller also turns the air moving device on when the voltage across the metal-air cell, as measured by the power sensor, is less than or equal to a first predetermined voltage. The predetermined voltage may be approximately 4.7 volts. The air moving device controller turns the air-moving device off when the voltage across the metal-air cell, as measured by the power sensor, is greater than or equal to a second predetermined voltage. The air moving device controller also turns the air-moving device off when the voltage across the metal-air cell, as measured by the power sensor, is greater than or equal to a second predetermined voltage. The predetermined voltage may be approximately 6.5–7.0 volts.

The method of the present invention provides for operating a metal-air battery. The method includes the step of: confining at least one metal-air cell within a housing. The metal-air cell includes an air electrode and the housing includes an air movement device and at least one air passageway. The method further includes the steps of sensing the voltage across the air electrode; activating the air movement device when a load is present on the air electrode and the voltage across the air electrode is less than or equal to a predetermined voltage so as to move air through passageway; and deactivating the air movement device when the voltage across the air electrode is greater than or equal to a second predetermined voltage.

Another embodiment of the present invention provides an apparatus for controlling the operation of a fan for a metal-air battery. The apparatus includes a power sensor operable for monitoring an input port for the presence of a load, connecting the battery to the load in response to detecting the presence of the load at the input port, and providing an output signal representative of the voltage across the input port. The apparatus further includes a fan controller operable for determining whether the output signal is within a predetermined range and activating the fan in response to determining that the output signal is within the predetermined range. The predetermined range may be about 4.7 to about 7.0 Volts.

The apparatus also may include a switch driveable by the fan controller for connecting the battery to the load. The apparatus also may include an electrostatic charge protection device driveable by the fan controller. The electrostatic charge protection device is operable for dissipating an electrostatic charge across the load in response to detecting that the load has an electrostatic charge build-up. Further, the power sensor also may include a bridge circuit driveable by the load. The bridge circuit is operable for driving the switch for connecting the battery to the load. The power sensor also may include a hysteresis voltage driver driveable by the bridge circuit. The hysteresis voltage driver is operable for preventing the battery from being disconnected from the load.

A further embodiment of the present invention provides an apparatus for controlling the operation of a fan for a metal-air battery. The apparatus includes means for detecting voltage across the metal-air battery. The means for detecting voltage includes means for monitoring an input port for the presence of a load, means for connecting the battery to the load in response to detecting the presence of the load at the input port, and means for providing an output signal representative of the voltage across the input port. The apparatus further includes means for regulating the voltage of the metal-air battery. The means for regulating the voltage includes means for determining whether the output signal is within a predetermined range and means for activating the fan in response to determining that the output signal is within the predetermined range.

A further embodiment of the invention provides means for determining whether a load is on the metal-air battery and the extent of the load includes a power sensor to monitor the load current and the voltage across the metal-air cell. The air moving device controller turns the air moving device on when both the current through a current sensing element, such as a resistor, is greater than a predetermined current value and the voltage across the metal-air cell, as measured by said power sensor, is less than or equal to a predetermined voltage. The air moving device controller first determines whether the current passing through the current sensing element is greater than a first predetermined current value to activate the air-moving device. Typically, the current is approximately between 350 and 500 milliamperes. Next, the air moving device controller monitors the load to ensure that the current it is above a second predetermined current level. The current induced by the load must be greater than the second predetermined level to sustain operation of the air moving device controller. Typically, the second predetermined level is approximately in the range of 75–300 milliamperes.

Once the air moving device controller determines that sufficient current is present to sustain the operation of the air moving device controller, the air moving device controller monitors the voltage across the metal-air cell. When the voltage across the metal-air cell, as measured by the power sensor, is less than or equal to a first predetermined voltage, the air moving device controller turns the air-moving device on. The predetermined voltage may be approximately 4.7 volts. The air moving device controller also turns the air-moving device off when the voltage across the metal-air cell, as measured by the power sensor, is greater than or equal to a second predetermined voltage. The predetermined voltage may be approximately 7.0 volts.

Thus, it is an object of the present invention to provide an improved air manager system for a metal-air battery.

It is another object of the present invention to provide a self-regulating air manager system for a metal-air battery.

It is a further object of the present invention to provide an air manager system for a metal-air battery without mechanical air doors.

It is a still further object of the present invention to provide an air manger system for a metal-air battery with an automatic fan.

It is a still further object of the present invention to provide for an efficient air manager system for a metal-air battery.

It is a still further object of the present invention to provide for an air manager system for a metal-air battery with a long shelf life.

It is a still further object of the present invention to provide a quiet air manager system for a metal-air battery.

It is a still further object of the present invention to provide a charge prevention function to protect the camcorder battery during charging operations.

Other objects, features, and advantages of the present invention will become apparent upon reviewing the following description of preferred embodiments of the invention, when taken in conjunction with the drawings and the appended claims.

DETAILED DESCRIPTION

Figure 1:
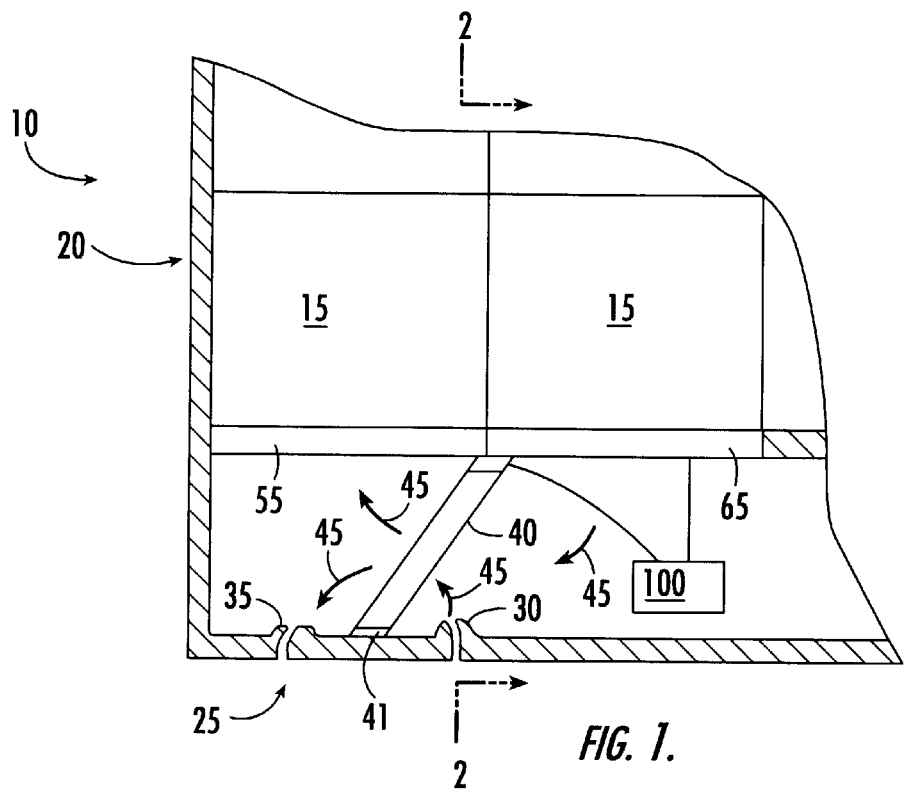
FIG. 1 is a cut-away diagrammatic top view of the battery housing embodying the present invention, showing the position of the cells, the fan, and the air openings, in combination with the direction of the flow of air with respect to the housing.

Referring now in more detail to the drawings, in which like numerals refer to like parts throughout the several views, FIGS. 1–4 show a metal-air battery 10 embodying the present invention. The metal-air battery 10 may be similar to that disclosed in commonly owned U.S. Pat. No. 5,641,588 to Sieminski, et al., commonly owned U.S. Pat. No. 5,356,729 to Pedicini, et al., commonly owned U.S. Pat. No. 5,691,074 to Pedicini, and commonly owned U.S. Pat. No. 5,919,582, which are incorporated herein by reference, or other known metal-air battery configurations.

The metal-air battery 10 includes a plurality of metal-air cells 15 enclosed within a housing 20. The housing 20 isolates the cells 15 from the outside air with the exception of a plurality of diffusion tubes or ventilation openings 25. In the embodiment shown in FIGS. 1 and 2, a single air inlet opening 30 and a single air outlet opening 35 are utilized. The number of openings 25 is not as important as the aggregate size of the openings 25 in connection with the shape of each opening 25. Alternatively, a single opening 25 may be utilized to provide air to the cells 15. The openings 25 would function as both an inlet and an outlet with reciprocating airflow therethrough. Further, multiple passageways or openings 25 can be utilized in the aggregate such that the openings 25 function in unison as inlets, and thereafter function in unison as outlets, in an alternating fashion.

Figure 2:
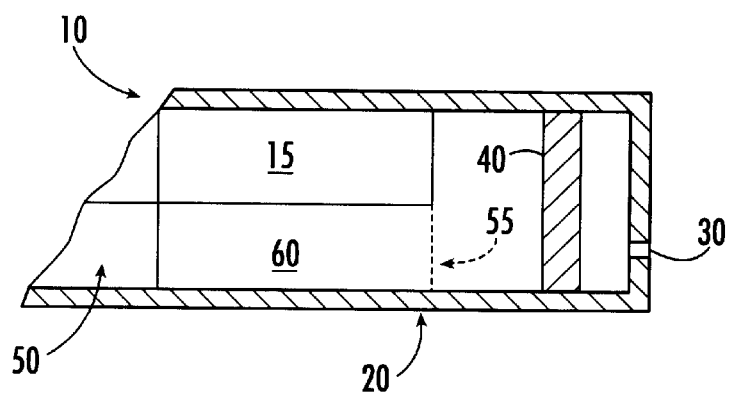
FIG. 2 is a vertical cross sectional view taken along line 2—2 of FIG. 1.

The housing 20 itself may be any type of conventional, substantially air-tight structure. The number of cells 15 within the housing 20 depends upon the nature of the load intended for the battery 10. The present invention is not dependent upon the configuration of the cells 15 within the housing 20 or the number of cells 15 within the housing 20. FIGS. 1 and 2 therefore show a cutaway view of a metal-air battery housing 20 showing only the essential elements of the present invention, i.e., a housing 20, one or more cells 15, and the air openings 25. Although only two cells 15 are shown in FIGS. 1 and 2, it is understood that the number and configuration of the cells 15 depends upon the power requirements for the battery 10.

A circulating fan 40 is provided for convective airflow both in and out of the housing 20 and to circulate and mix the gasses within the housing 20. The arrows shown in FIG. 1 represents a typical circulation of gasses into, out of, and within the housing 20 to provide the reactant air to the cells 15. The capacity of the fan 40 also depends upon the size of the housing 20 and the power demands of the battery 10. The term "fan" 40 as used herein is intended to mean any device to move air, including a pump.

The fan 40 may be positioned within the housing 20 or adjacent to the housing 20 in communication with one of the openings 25. If the fan 40 is located within the housing 20, the ventilation openings 25 are positioned such that the inlet opening 30 and the outlet opening 35 are positioned on opposite sides of the fan 40. The only requirement for the positioning within the housing 20 of the fan 40 and the openings 25 is that they are in sufficiently close proximity to each other to create a convective air flow into, through, and out of the housing 20. The fan 40 may be mounted within or adjacent to the housing 20 in any convenient manner. The fan 40 is generally sealed into place by a gasket 41 or other conventional means to ensure that the low pressure and high pressure sides of the fan 40 are isolated from one another.

As is shown in FIG. 2, the plurality of cells 15 within housing 20 are generally arranged such that a reactant air plenum 50 is positioned under or over the cells 15. The air plenum 50 defines an air plenum inlet 55, an air passageway 60, and an air plenum outlet 65. The fan 40 is generally positioned between and isolates the air plenum inlet 55 from the air plenum outlet 65 for efficient airflow through the housing 20. Examples of air plenum designs are shown in the commonly-owned references cited above. As described above, the present invention is not dependent upon any particular air plenum design.

Figure 3:
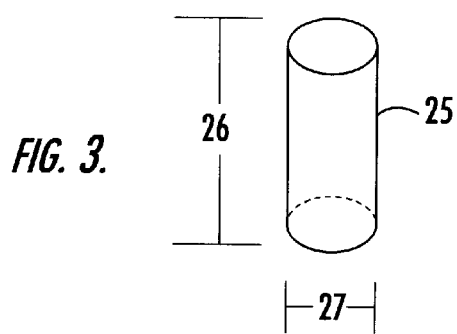
FIG. 3 is a diagrammatic pictorial view of a ventilation opening.

As is shown in FIG. 3, the ventilation openings 25 are preferably sized such that their length 26, i.e., the direction through the thickness of the housing 20, is greater than their width 27, i.e., the direction perpendicular to the thickness of the housing 20. By using a large enough ratio between the length 26 and the width 27 for the ventilation openings 25, it has been found that diffusion of air through the openings 25, without the assistance of the fan 40, is substantially eliminated. By "substantially eliminated," it is meant that the rate of diffusion of oxygen or contaminates through the openings 25 is so slow that humidity transfer or drain current is sufficiently small and has little appreciable impact on the efficiency or lifetime of the battery 10. In sum, the openings 25 are sufficiently long and narrow to provide a barrier to diffusion of gases therethrough when the fan 40 is turned off.

This desired ratio between length 26 and width 27 is at least about two to one. These ratios are sufficient to prevent appreciable diffusion through the openings 25 when the fan 40 is turned off while permitting convective airflow therethrough when the fan 40 is turned on. The use of larger ratios between length 26 and width 27 is preferred. Depending upon the nature of the battery 10, the ratio can be more than 200 to 1. The preferred ratio is about 10 to 1.

In use, ambient air is drawn into the air inlet 30 by pull of the fan 40 when the fan 40 is turned on. As is shown by the arrows 45 in FIG. 1, the air is then drawn through the fan 40 and into the air plenum 50. The air enters the air plenum 50 through air plenum inlet 55, travels though the pathway 60 to provide a reactant airflow for the cells 15, and exits via the air plenum outlet 65. The air is then again drawn into the fan 40 where it either mixes when fresh incoming ambient air or is forced out of the housing 20 via air outlet 35. When the fan 40 is turned off, the rate of diffusion of air through the openings 25 is reduced to acceptable levels such that a mechanical air door is not required.

Figure 4:
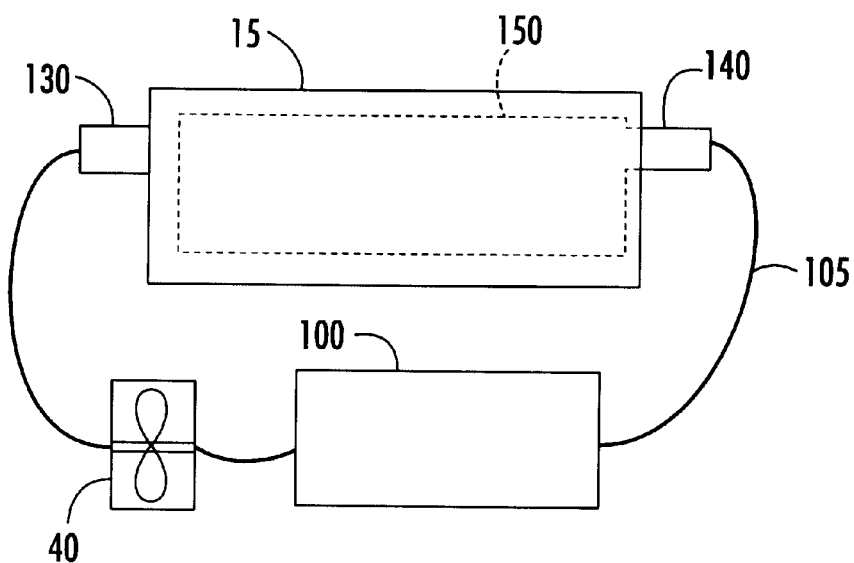
FIG. 4 is a schematic view of the power sensor circuit.

As is shown in FIGS. 1 and 4, the invention includes a voltage monitor 100 to determine the voltage across the cell 15 or other electrical characteristics and to control the operation of the fan 40. The voltage monitor 100 can be positioned at any convenient location within or adjacent to the housing 20. The preferred voltage monitor 100 is a programmable voltage detection or sensing device such as that sold by Maxim Integrated Products under the mark MAX8211 and MAX8212. Depending upon the desired operation of the fan, the voltage monitor 100 can be an analog circuit for a simple "on/off" switch or can incorporate a microprocessor (not shown) for a more complex algorithm. The voltage monitor 100 of FIGS. 1 and 4 is an analog circuit.

The voltage monitor 100 determines the voltage across the air electrode 150 of the cell 15. The air electrode 150 is shown in phantom lines in FIG. 4. Because the zinc potential within the air electrode 150 of each cell 15 is relatively stable, the air electrode 150 is used to sense the residual oxygen in the cell 15. As the oxygen within the housing 20 is depleted, the voltage across each air electrode 150 diminishes. Likewise, as the flow of oxygen into the housing 20 increases, the voltage across the air electrode 150 increases.

A preferred air electrode 150 is disclosed in commonly owned U.S. Pat. No. 5,569,551 and commonly owned U.S. Pat. No. 5,639,568, which are incorporated herein by reference. U.S. Pat. No. 5,639,568 discloses a split anode for use with a dual air electrode metal-air cell. Although the use of the invention with a zinc-air battery is disclosed, this invention should be understood as being applicable to other types of metal-air battery cells.

As is shown in FIG. 4, the voltage monitor 100 is connected to the cells 15 in a voltage monitor circuit 105 via a cathode tab 130 and an anode tab 140. The voltage monitor circuit 105 also includes the fan 40. All of the cells 15 within the housing 20 are connected in this circuit 105. The voltage across the cells 15 is continually monitored to ensure that the voltage does not drop below a predetermined voltage $V_{p1}$. If the voltage does drop to $V_{p1}$, the fan 40 is turned on and then runs continuously until the voltage is increased to a second predetermined voltage $V_{p2}$. The fan 40 is then turned off and remains off until the voltage again drops to $V_{p1}$. The predetermined voltages $V_{p1}$ and $V_{p2}$ are programmable values in the voltage monitor 100.

Figure 5:
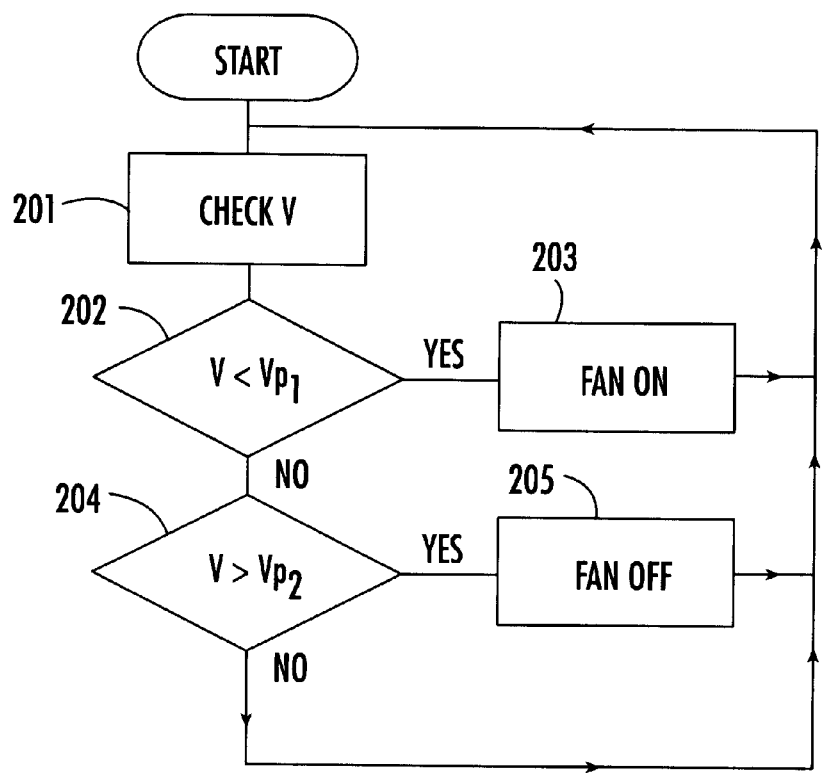
FIG. 5 is a flow chart showing the operation of the fan based upon the detected voltage.

The operation of the fan 40 is shown in FIG. 5. The algorithm is an "on/off" type with predetermined values. As is shown in step 201, the voltage monitor 100 measures the voltage across the air electrode 150. In step 202, the voltage monitor 100 determines if the voltage is less than or equal to $V_{p1}$. If so, the voltage monitor 100 turns on the fan 40 in step 203. If not, the voltage monitor 100 determines if the voltage is greater than or equal to $V_{p2}$ in step 204. If so, the voltage monitor 100 turns off the fan 40 in step 205. If not, the voltage monitor 100 returns to step 201. This algorithm may be modified to add an additional step of first checking if a load is present on the battery 10. If so, the voltage monitor 100 proceeds to step 201 as shown above. If not the fan 40 will remain in the off state.

Alternatively, the speed of the fan 40 maybe altered depending upon the drain rate of the battery 10 as a whole or other electrical parameters. In other words, the voltage monitor 100 can be replaced with other types of conventional electrical sensors known to those practicing in the art. For example, a conventional power sensor, i.e., a sense resistor, could be used. This monitor 100 can set the speed of a variable speed fan 40 as a function of current draw. Instead of the algorithm of FIG. 5, the circuit 105 would contain a conventional microprocessor with a look-up table to compare the determined current draw with a voltage input value for the fan 40. The input voltage and speed of the fan 40 varies with the determined output current drain. The physical arrangement of the components in this embodiment is the same as that described above.

The operation of the invention is shown in an example using a six (6) volt battery 10. Such a battery 10 has six (6) metal-air cells 15, with each cell 15 having an output of about 1.0 volt or slightly higher at about 1 to 4 amps. An up-converter (not shown) also may be used. The housing 20 has openings 25 with a length 26 to width 27 ratio of about four (4) to one (1). The gas flow through the housing when the fan 40 is on is about 15 to about 30 cubic inches per minute for an output current of about 1 amp. When the fan 40 is turned off, the gas flow rate is reduced to about 0 to about 0.03 cubic inches per minute or less, with a leakage current of less than 1 mA. The ratio of output current density with the fan 40 turned on to drain current density with the fan 40 turned off is expected to be at least 100 to 1 in an efficient battery 10. It is understood that the respective sizes, capacities, densities, flow rates, and other parameters discussed above are dependent upon the overall size and power requirements of the battery 10.

The first predetermined voltage $V_{p1}$ under which the voltage should not fall may be about 1.0 volts per cell 15 or about 5.0 volts for the battery 10 as a whole. The fan 40 is turned on when the voltage monitor 100 determines that the voltage of the battery 10 has reached about 1.0 volts per cell 15 or about 5.0 volts for the battery 10 as a whole. The fan 40 then stays on until the voltage of the battery 10 reaches about 1.1 volts per cell 15, or about 5.5 volts for the battery 10 a whole. The fan 40 remains off until the voltage again reached about 1.0 volts per cell 15 or about 5.0 volts for the battery 10 as a whole.

Assuming the drain rates given above, it would take approximately one month for the six (6) volt battery 10 of the present example to fade from about 1.1 volts per cell 15 to about 1.0 volts per cell 15 to trigger the fan 40 during periods of non-use. The shelf life of the battery 10 would be at least several years. The battery 10 would be immediately ready for use without the need for any independent activation of the battery 10 such as by turning on the fan 40 or by opening a mechanical air door. Rather, the battery 40 is ready for use. The activation of a load on the battery 10 will cause the voltage across the cells 15 to drop as the oxygen within the housing 20 is consumed. This voltage drop will activate the fan 40 until the proper amount of oxygen is introduced into the housing 20 and the proper voltage is restored.

Figure 6:
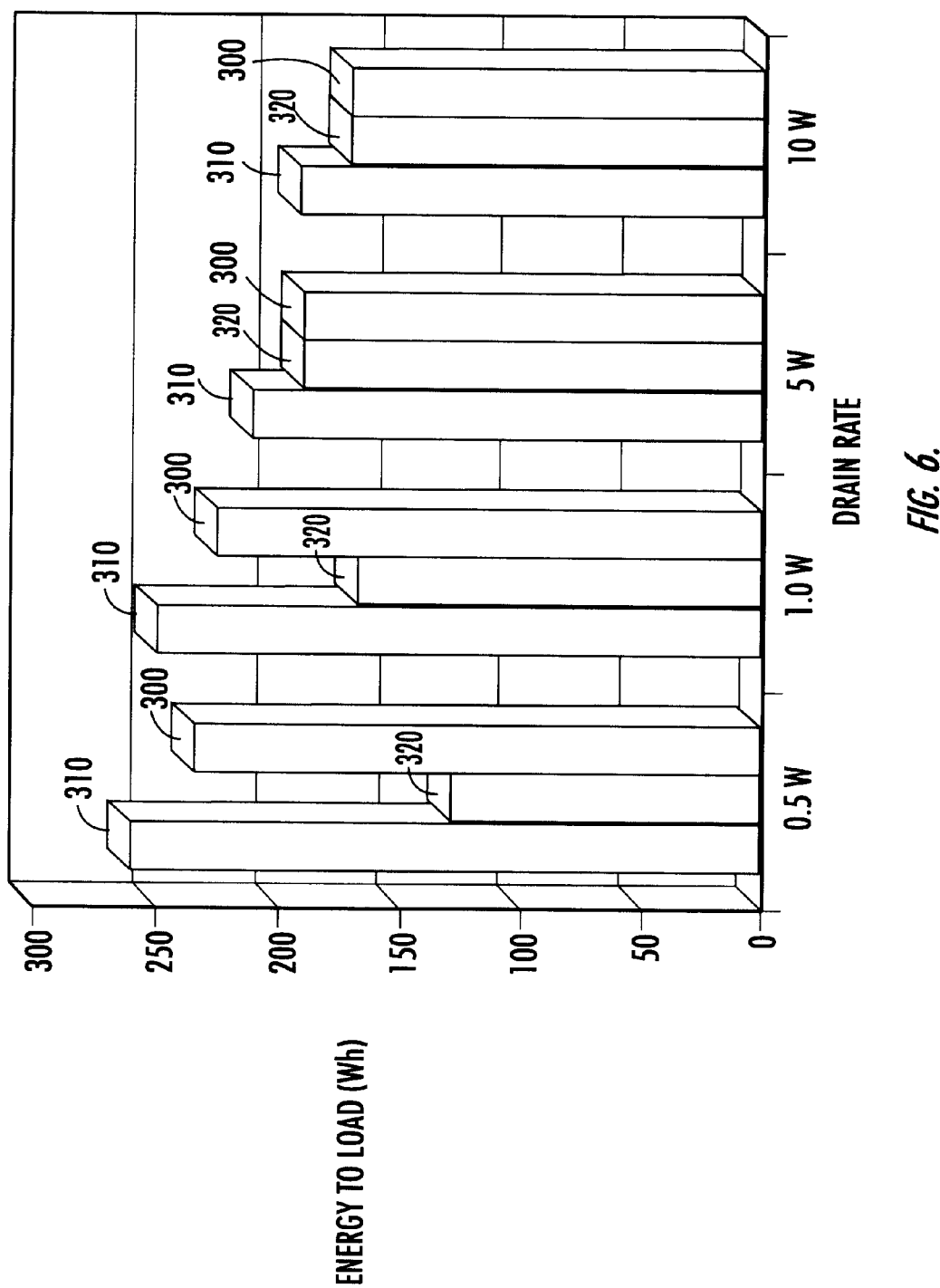
FIG. 6 is a comparison chart showing the power consumption of an air manager system in a six (6) volt battery with several fan options.

In addition to the present invention being self-regulating, the present invention also provides an energy efficient air manager system. The efficiency of the battery 10 as a whole is increased because the running of the fan 40 is minimized. FIG. 6 compares the energy to load ratio 300 of the present invention in terms of the energy to load ratio 310 of a battery without a fan and with the energy to load ratio 320 of a fan running constantly at various drain rates. As described above, most air manager systems either run the fan continuously or employ a variable speed fan as is described in Cheiky. As is shown in FIG. 6, the present invention provides efficiencies of essentially ninety percent (90%) of an air manager system without a fan.

For example, the energy to load ratio 300 of the present invention in a six (6) volts battery is about 235 Wh while the energy to load ratio 310 of an air manager system without a fan is about 250 Wh. The energy to load ratio 320 of an air manager system with a fan running continuously is only about 135 Wh. The pulsing fan operation of the present invention is therefore an improvement of almost 100 Wh as compared to a constantly running fan. The improvement is maintained until drain rates reach about 5 watts. At that point, the fan 40 of the present invention is essentially running continuously.

Although these efficiencies may be possible with the variable speed fan of Cheiky, the present invention uses a simple on/off switch rather than the complex, load specific algorithm disclosed therein. In other words, Cheiky requires a specific algorithm for each different type of load. The present invention, however, is available to provide power to almost any type of electrical device.

In sum, by pulsing the fan 40 as described herein, several goals are achieved:

1. The life of the battery 10 is maximized from the standpoint of environmental exposure. In other words, only enough oxygen is admitted into the housing 20 as is needed to maintain the predetermined voltages.

2. Power consumption of the fan 40 is minimized as a percentage of the power consumed by the battery 10 as a whole. For example, a fifty percent (50%) duty cycle may be all that is required at low drain rates. This decreases the overhead energy consumed by the battery 10 as a whole.

3. Because the fan 40 runs in a duty cycle, the battery 10 as a whole is quieter than a battery 10 with a continuously running fan 40.

The present invention therefore can provide a battery 10 with a relatively long shelf life without the need for a mechanical air door or a fan switch. The present invention can function as, for example, a power source of an emergency device than can be automatically activated because there is no need for a separate activation step. More importantly, the present invention provides for an efficient air manager system that minimizes the running of the fan 40 and the energy drain associated with the fan 40.

Figure 7:
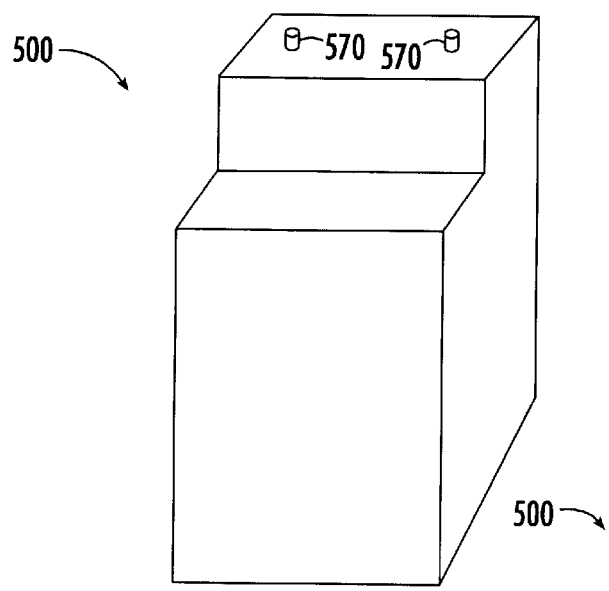
FIG. 7 is a plan view of a camcorder battery of an alternative embodiment of the present invention.
Figure 8:
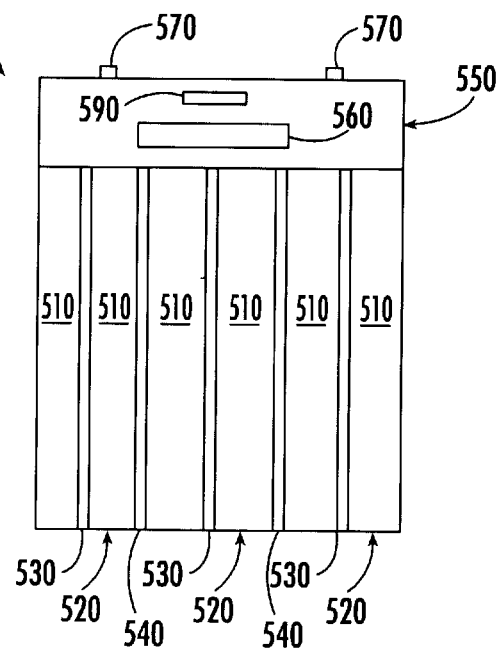
FIG. 8 is a side cross-sectional view of the camcorder battery of the FIG. 7.

FIGS. 7 and 8 show a further embodiment of the present invention. These figures show a metal-air battery 500. The metal-air battery 500 is in the form of, for example, a camcorder battery. The metal-air battery 500 includes six (6) metal-air cells 510. The metal-air cells 510 are of conventional design and may be similar to the cells 15 described above. Likewise, each metal-air cell 510 has one or more air electrodes 515. The air electrodes 515 are also of conventional design and may be similar to the air electrodes 150 described above. In this embodiment, the metal-air cells 510 are arranged in three (3) pairs 520 with each pair 520 sharing an air plenum 530. The air plenums 530 may be of conventional design. The metal-air cell pairs 520 are each separated by a separator layer 540. The separator layers 540 may be made from a substantially rigid, non-air permeable material or simply may be a plurality of protrusions on the outer casing of the metal-air cells 510. The metal-air cells 510 each have dimensions of approximately 4 by 7 by 0.6 cm. Likewise, the air plenums 530 may have a width of approximately 0.1 cm. Each cell 510 may have a voltage of about one (1) Volt such that the battery 500 as a whole will have a voltage of about six (6) Volts.

Positioned over the metal-air cells 510 is an air manager unit 550. The air manager unit 550 includes a fan 560 and one or more ventilation openings or diffusion tubes 570 extending through the battery housing as described above. The fan 560 may be of any conventional design and may be similar to the fan 40 described above. The needed fan capacity should be varied based on the size of the cells to which air is supplied and the amount of electrical current being supported by the battery. In this embodiment, the fan 560 may have a capacity of about 1–10 liters per minute of standard air, to support a current of up to about 6 amperes. The one or more diffusion tubes 570 may be similar to the ventilation openings 25 described above, i.e., the diffusion of air through the diffusion tubes 570, without the assistance of the fan 560, is substantially eliminated such that the rate of diffusion of oxygen or contaminates through the tubes 570 is sufficiently slow and has little appreciable impact on the efficiency or lifetime of the battery 500.

Also positioned within or adjacent to the air manager unit 550 is a fan control circuit 580. The fan control circuit 580 includes a voltage monitor 590 to determine the voltage across the cells 510 or other electrical characteristics and to control the operation of the fan 560. The voltage monitor 590 may be of conventional design and may be similar to the voltage monitor 100 described above. In this embodiment, the voltage monitor 590 incorporates a camcorder battery circuit 600 as described below for the execution of a more complex function than the "on/off" design of the voltage monitor 100.

Figure 9:
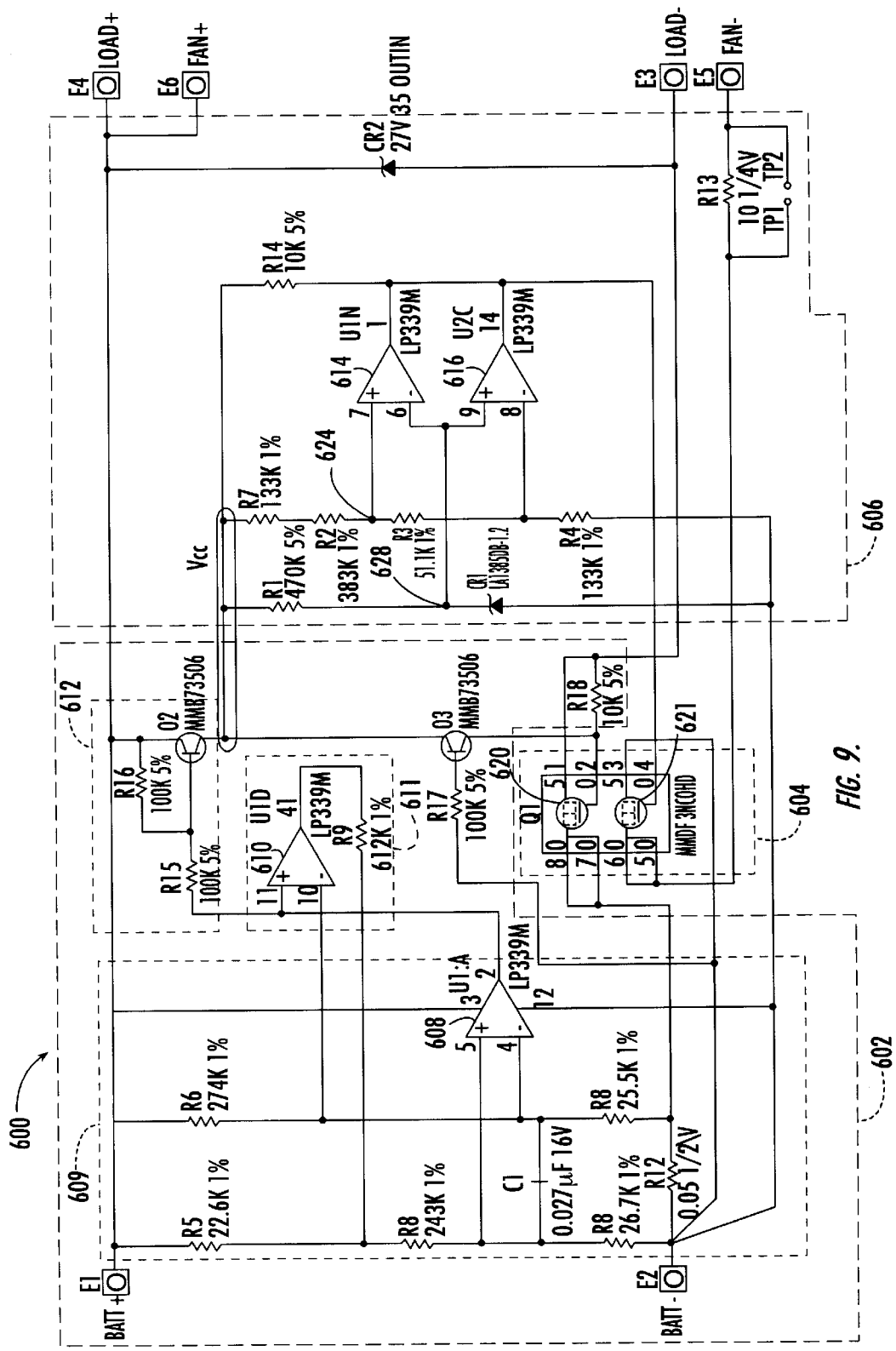
FIG. 9 is a schematic diagram showing the voltage control circuit of the alternative embodiment.

FIG. 9 shows an electrical schematic for the preferred embodiment of the camcorder battery circuit 600. The camcorder battery circuit 600 has two main functions: (1) to monitor the voltage output of the battery 500 and (2) to monitor the voltage output to the internal fan 560 which forces air into the air plenums 530. The electrical circuit 600 is comprised of three circuit components shown by the dashed lines in FIG. 9: a power sensor 602; a switch 604; and a fan controller 606.

The camcorder battery circuit 600 contains a first comparator 608, a second comparator 610, a third comparator 614 and a fourth comparator 616. The combination of comparators 608, 610, 614, 616 is preferably implemented by a quad, ultra low power, and low offset voltage comparator, such as the model LP339M manufactured by Texas Instruments Corporation, of Dallas, Tex.

The power sensor 602 includes the first comparator 608 and the second comparator 610. The resistors $R_5$, $R_6$, $R_8$, $R_{10}$, $R_{11}$, and $R_{12}$ form a resistive bridge. The first comparator 608 in combination with the resistive bridge formed by the resistors $R_5$, $R_6$, $R_8$, $R_{10}$, $R_{11}$, and $R_{12}$ form a bridge circuit 609. When there is no load applied across battery output terminals $E_3$ and $E_4$, the output of the comparator 608 is high. The voltages at the inverting terminal and non-inverting terminal of first comparator 608 are unequal and the output of first comparator 608 is high.

When a load is applied across the output battery terminals $E_3$ and $E_4$, current flows through the resistor $R_{12}$. The voltage that appears at the inverting input of the first comparator 608 will be greater than voltage at the non-inverting input such that the output voltage of first comparator 608 will be at ground. When the output of first comparator 608 is at ground, a current path is established through the resistors $R_{15}$ and $R_{16}$ and the first comparator 608 from the terminal $E_1$ to the terminal $E_2$. The resulting voltage drop across $R_{16}$ provides a large forward bias voltage across the emitter-base junction of transistor $Q_2$, thereby allowing current to pass therethrough. The combination of the transistor $Q_2$ and the resistors $R_{15}$ and $R_{16}$ form a voltage switch 612. The bias voltage is chosen such that the transistor $Q_2$ operates in saturation mode whenever the output of the first comparator 608 is at ground. This ensures that the voltage drop across the transistor $Q_2$ is minimal when the transistor $Q_2$ is conducting. Preferably, the transistor $Q_2$ is a small signal pnp transistor, such as the model MMBT3906 manufactured by the Motorola Corporation, of Schaumburg, Ill.

Each function (e.g., record, rewind, play, view, etc,) of the camcorder typically will have different operating current levels. Each of these different operating currents produces a corresponding voltage level across the current sensing resistor $R_{12}$. Some of these voltage levels may be below the initial reference voltage at the non-inverting input of the first comparator 608. To protect the circuit 600 from disconnecting the load from the battery 500, the current-sensing circuit 602 lowers the voltage at the non-inverting input of the first comparator 608 by establishing a hysteresis voltage driver. Second comparator 610 and resistor $R_9$ form the hysteresis voltage driver. The output of the first comparator 608 is connected to the non-inverting input of the second comparator 610. When the output of the first comparator 608 is high, the non-inverting input of the second comparator 610 is also high. The inverting input of the second comparator 610 is connected to the positive voltage across the resistor $R_6$. Because the voltage across the resistor $R_6$ is less than an input voltage applied across input ports $E_1$ and $E_2$, the output of the second comparator 610 is high. Therefore, when no load is applied to the output ports $E_3$ and $E_4$, no current flows through the resistor $R_9$.

When the output of the first comparator 608 is at ground, the voltage level at the non-inverting input of the second comparator 610 will be greater than the voltage level at the inverting input of the second comparator 610. Therefore, the output of the second comparator 610 is at ground, which causes current to flow through the resistor $R_9$. This places the resistor $R_9$ in parallel with the resistors $R_8$ and $R_{10}$, which produces a hysteresis effect. The resulting combination of the resistor $R_9$ in parallel with the resistors $R_8$ and $R_{10}$ reduces the resistance of the bridge circuit, which causes a downward shift in the voltage level at the non-inverting input of the first comparator 608. The input voltage level at the non-inverting input of the first comparator 608 is now at a level below the minimum voltage, which corresponds to the minimum current required to operate the camcorder in a given mode. Reducing the voltage at the non-inverting input ensures that the load will not be disconnected from the battery 500 due to changes in the voltage during the operation of the camcorder.

The switch 604 comprises the component transistor $Q_1$. Typically, the transistor $Q_1$ is a dual TMOS Power metal-oxide semiconductor field effect transistor (MOSFET), such the model MMDF3N03HD manufactured by the Motorola Corporation, of Schaumburg, Ill. The input signal of a gate of a transistor 620 is supplied by the output of the transistor $Q_3$, which in turn is driven, by transistor $Q_2$. Preferably, the transistor $Q_3$ is a small signal pnp transistor, such as the model MMBT3906 manufactured by the Motorola Corporation, of Schaumburg, Ill.

When the transistor 620 is in the "OFF", or nonconducting state, current flows through a body drain diode, which is inherent to transistor 620. The output voltage at terminals E3 and E4 is then approximately equal to a voltage drop across the drain diode, $V_{drain}$. When the transistor $Q_2$ is conducting, the emitter of $Q_3$ will be at a voltage VCC, which is essentially equal to the battery voltage $V_{batt}$. Current will flow through the base-emitter junction of $Q_3$ due to the base being tied to ground through R17. This allows $Q_3$ to conduct current to the collect node, which is connected to the gate of the transistor 620. This allows the gate of transistor 620 to be positively biased at nearly the battery voltage $V_{batt}$ (the voltages $V_{Q2}$ and $V_{Q3}$ across the transistors $Q_2$ and $Q_3$, respectively, are negligible). The positive bias at the gate of the transistor 620 creates a channel so that current flows from the drain to the source of the MOSFET transistor 620 and the body drain diode is removed from the circuit. The entire load current is conducted through the transistor 620 with negligible losses. The source of the transistor 620 is connected to the output terminal $E_3$. Thus, when the transistor 620 is conducting, a voltage nearly equal to the battery voltage appears across the output terminals $E_3$ and $E_4$ of the battery 500.

The transistor 620 in combination with transistor $Q_3$ and $R_{18}$ acts as a charge prevention circuit. In the event that a power source capable of causing current to flow in a direction opposite to that of the load current, is attached to the output battery terminals $E_3$ and $E_4$, the circuit keeps transistor 620 in the "OFF" state thereby preventing current from passing through transistor 620. Resistor $R_{18}$ provides a bleed path for the gate charge on transistor 620 and the leakage current of $Q_3$ so that transistor 620 is not turned on when a power source having a positive polarity is applied across terminal $E_3$ and $E_4$.

Referring again to the transistor $Q_2$, the output of the transistor $Q_2$ also is connected to the fan controller 606. The output voltage VCC from the power sensor 602 powers the fan controller 606. A voltage reference element, $CR_1$ establishes a constant voltage at a node 628. Preferably, $CR_1$ is an integrated circuit, micropower voltage reference element, such as the model LM385BD-1.2 manufactured by the Motorola Corporation. In the preferred embodiment, the voltage established by $CR_1$ is about 1.24 volts. Those skilled in the art will appreciate that other voltage reference elements that have different voltage values may be used as long as the specified voltage is less than the voltage VCC established by the transistor $Q_2$.

The Resistor $R_1$ supplies enough bias current to meet the requirements of $CR_1$ and one input of each of the third and fourth comparators 614 and 616. Therefore the resistor $R_1$ and $CR_1$ establish a known, fixed voltage reference. The resistors $R_2$, $R_7$, $R_3$, and $R_4$ form a voltage divider circuit connected to the third and fourth comparators 614 and 616.

These comparators 614 and 616 are wired in a window comparator configuration. In this configuration, if the output of either comparator is negative, the output of both comparators is negative. More specifically, if the voltage at the node 624, which is connected to the non-inverting input of the third comparator 614 is greater than the reference voltage established by $CR_1$, the output of the third comparator 614 will be positive, which corresponds to an open circuit.

The output of the third and fourth comparators 614 and 616 are connected to the gate of the transistor 621 in the transistor $Q_1$. When either the output of the third comparator 614 or the fourth comparator 616 is positive, the gate voltage of the transistor 621 is positively biased which results in a low-channel resistance being formed between the source to the drain. The drain of the transistor 621 is connected to the negative terminal of the fan 560. Therefore, whenever the gate of the transistor 621 is positively biased, the transistor 621 will conduct. This causes a voltage across the terminals $E_5$ and $E_6$ that activates the fan 560.

Generally, when the output voltage VCC is within a predetermined voltage range, the output of the comparators 614, 616 will be positive and voltage will be supplied to the fan 560 through the transistor 621. This range is set by the values chosen for the resistors $R_2$, $R_3$, $R_4$, and $R_7$. In the preferred embodiment, the predetermined voltage range is 4.7–6.5 volts, and the values of the resistors $R_2$, $R_3$, $R_4$, and $R_7$ are 383 KΩ, 51 KΩ, 133 KΩ, and 133 KΩ, respectively. However, those skilled in the art will appreciate that other predetermined voltage ranges that are within the voltage limits of the battery 500 may be used by selecting different values of the resistors $R_2$, $R_3$, $R_4$, and $R_7$ without affecting the scope of the invention.

When the output voltage, VCC exceed 6.5 volts, the voltage at the inverting input of fourth comparator 616 will exceed the reference voltage established at the node 628. The output of fourth comparator 616 will become negative, thereby cutting off the voltage to the fan 560. Similarly, when VCC is less than the 4.7 volts, the voltage at the non-inverting input of the third comparator 614 will be less than the reference voltage at the node 628. The output of the third comparator 614 will go negative thereby cutting power off to the fan 560.

The resistor $R_{13}$, is a step-down resistor that reduces the voltage, which appears across terminals $E_5$ and $E_6$ to match the voltage requirements of the fan 560. $TP_1$ and $TP_2$ form a socket in which an additional resistor can be added to output voltage across terminals $E_5$ and $E_6$.

Finally, diode $CR_2$ is a Zener diode that protects the transistor $Q_1$ from large electrostatic discharge (ESD). Preferably, $CR_2$ is a Zener diode; such as the model number BZX84C27 manufactured by Vishay/LiteOn Corporation.

Figure 10:
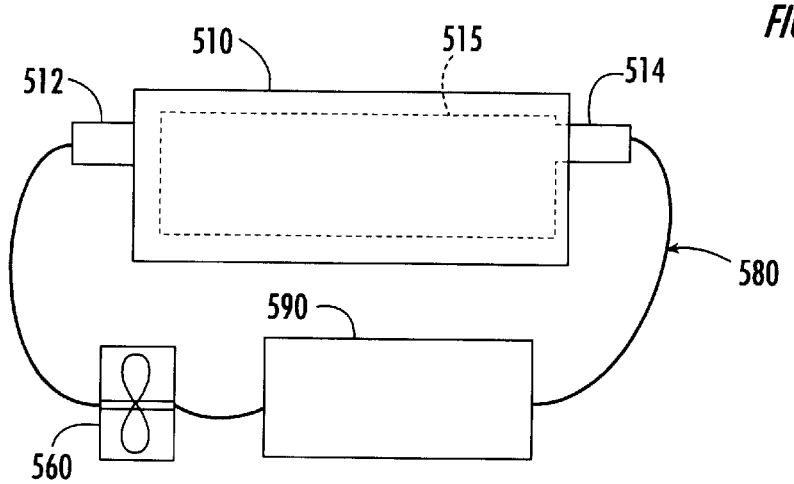
FIG. 10 is a schematic view of the power sensor circuit of the alternative embodiment.

As is shown in FIG. 10, the fan control circuit 580 includes each of the elements described in shown in FIG. 4. Specifically, the voltage monitor 590 is connected to the cells 510 via a cathode tab 512 and an anode tab 514 and to the fan 560. All of the cells 510 within the battery 500 are connected in this circuit 580. The voltage across the cells 510 is continually monitored to ensure that the voltage does not drop below a predetermined voltage $V_{p1}$. If the voltage does drop to or below $V_{p1}$, the voltage monitor 590 first determines if a sufficient load is on the battery 500.

Specifically, the voltage monitor 590 determines if the external current flow on the battery 500 is greater than the minimum camcorder current. In this embodiment, the minimum camcorder current is about 500 milliamperes to enable the operation of the camcorder and at least 100 milliamperes to sustain the operation of the camcorder. This first step is possible because this minimum camcorder current is reduced as compared to other known designs. If the voltage drops to or below $V_{p1}$, the fan 560 is turned on and then runs continuously until the voltage is increased to or above a second predetermined voltage $V_{p2}$. The fan 560 is then turned off and remains off until the voltage again drops to or below $V_{p1}$. As described above with respect to FIG. 9, the predetermined voltages $V_{p1}$ and $V_{p2}$ are programmable values in the voltage monitor 590. In the present embodiment, $V_{p1}$ and $V_{p2}$, $V_{p1}$ may be about 4.7 Volts and $V_{p2}$ may be about 7.0 Volts.

The camcorder battery circuit 600 of the voltage monitor 590 also may use hysteresis to prevent erratic operation of the fan 560 as operating modes of the camcorder are changed. In other words, a sudden but short increase in the electrical load on the battery 500 when, for example, the user presses the Play, Record, or Rewind buttons, will not necessarily activate or deactivate the fan 560 immediately.

Other features of the camcorder battery circuit 600 include the use of charge prevention. Charge prevention is accomplished by having a minimal voltage drop at the battery tabs 512, 514 during normal battery discharge. In other words, the battery voltage at the tabs 512, 514 will be approximately 50–100 mV less than the internal raw battery 500 voltage. The camcorder battery circuit 600 also incorporates electrostatic discharge protection on the battery tabs 512, 514 to prevent damage to the circuitry within the battery 500.

Figure 11:
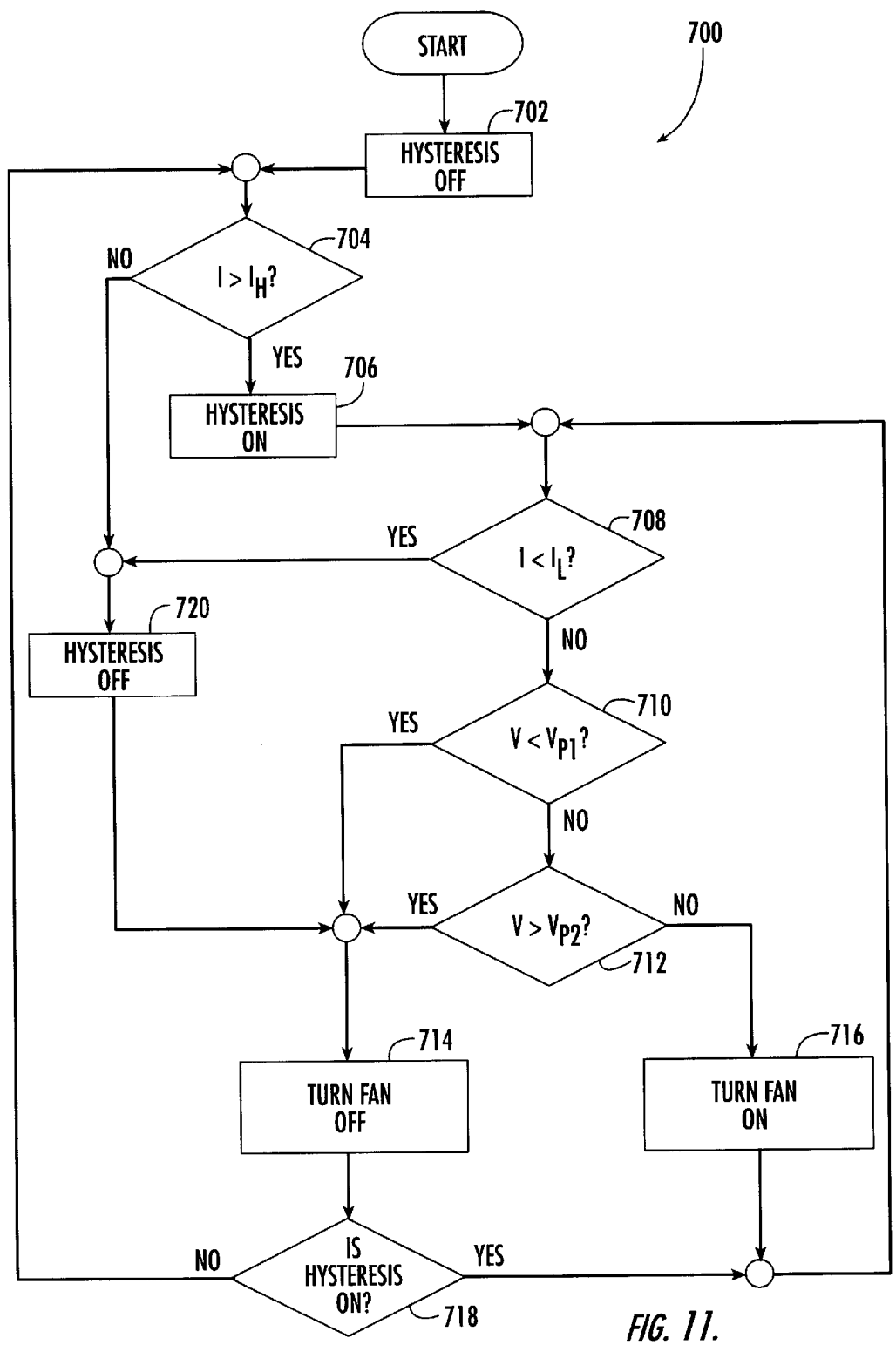
FIG. 11 is a flow chart showing the operation of the fan based on the detected current and detected voltage.

The algorithm 700 in FIG. 11 shows an alternative embodiment of the operation of the fan 40. The algorithm 700 is an "on/off" type with predetermined values. As is shown in step 702, the hysteresis is OFF, which corresponds to the output of the hysteresis voltage driver 611 being open circuit. In step 704, the power sensor 602 determines whether the current through the current sensing resistor $R_{12}$ is greater than an upper threshold current $I_H$. Typically, the threshold current $I_H$ is in the range of approximately 350–500 milliamperes. If so, the hysteresis is ON in step 706, which corresponds to the output of the hysteresis voltage driver 611 being low. This prevents the load from becoming disconnected during the operation of the camcorder.

The power sensor 602 next determines whether the load current through resistor $R_{12}$ is less than a lower threshold current, $I_L$ in step 708. Typically, the lower threshold voltage $I_L$ is in the range of approximately 75–300 milliamperes. If the load current is greater than the lower threshold current, the "NO" branch is followed to step 710 in which the fan controller 606 determines whether the load voltage is greater than $V_{p1}$. If so, the fan controller 606 turns the fan 40 off in step 714. If not, the algorithm proceeds to 712, in which the fan controller 606 determines if the load voltage is greater than $V_{p2}$. If the load voltage is greater than $V_{p2}$, the fan controller 606 turns off the fan 40 in step 714. Step 714 is followed by step 718 in which the fan controller 606 determines whether the hysteresis is ON. If so, the algorithm loops back to step 708. If not, the algorithm loops back to step 704.

Returning to step 712, if the load voltage is less than $V_{p2}$, the voltage monitor 100 turns the fan on at step 716. The algorithm branches back to step 708 to continue monitoring the load current and voltage.

Returning to step 708, if the load current is less than the lower threshold current, $I_L$, then the "YES" branch is followed to step 720, in which the hysteresis function is OFF. The fan monitor 606 then turns the fan 40 off in step 714. The algorithm proceeds to step 718, in which the determination is made whether the hysteresis is ON. If the hysteresis function is ON, the algorithm loops back to step 708. If not, the algorithm loops back to step 704.

Returning to step 704, if the power sensor 602 determines that the current through resistor $R_{12}$ is less than the upper threshold current $I_H$, The algorithm proceeds to step 720, in which the power sensor 602 switches the hysteresis OFF. In response, the fan controller 606 turns the fan off at step 714.

It should be understood that the foregoing relates only to preferred embodiments of the present invention, and that numerous changes may be made therein without departing from the spirit and scope of the invention as defined by the following claims.

We claim:

1. A battery, comprising:
   at least one cell isolated from ambient air except through at least one passageway;
   an air moving device operative to move air through said at least one passageway to provide reactant air to said at least one cell;
   said at least one passageway being operative, while unsealed and while said air moving device is inactive, to restrict air flow therethrough; and
   an air moving device controller;
   said air moving device controller comprising means for determining whether a load is on said battery and the extent of said load such that the operation of said air moving device is responsive to said air moving device controller.

2. The battery of claim 1, wherein said means for determining whether a load is on said battery and the extent of said load comprises a power sensor to monitor the current supplied by said cell.

3. The battery of claim 2, wherein said air moving device controller further comprises a fan controller to monitor the voltage supplied by the cell.

4. The battery of claim 3, wherein said air moving device controller turns said air moving device on when said voltage across said cell, as measured by said fan controller, is less than or equal to a first predetermined voltage.

5. The battery of claim 4, wherein said first predetermined voltage is approximately 4.7 volts.

6. The battery of claim 4, wherein said air moving device controller turns said air moving device on when the voltage across said cell, as measured by said fan controller, is less than or equal to the first predetermined voltage.

7. The battery of claim 4, wherein said air moving device controller turns said air moving device off when the voltage across said cell, as measured by said fan controller, is greater than or equal to a second predetermined voltage.

8. The battery of claim 7, wherein said second predetermined voltage is approximately 6.5 volts.

9. The battery of claim 7, wherein said second predetermined voltage is approximately 7.0 volts.

10. The battery of claim 7, wherein said air moving device controller turns said air moving device off when the voltage across said cell, as measured by said power sensor, is greater than or equal to the second predetermined voltage.

11. A method of operating a battery, said method comprising the steps of:
    confining at least one cell within a housing, said at least one cell comprising an air electrode and said housing comprising an air movement device and at least one air passageway;

sensing the voltage across said air electrode;

activating said air movement device when a load is present on said air electrode and the voltage across said air electrode is less than or equal to a predetermined voltage so as to move air through passageway; and deactivating said air movement device when the voltage across said air electrode is greater than or equal to a second predetermined voltage.

12. An apparatus for controlling the operation of a fan for a battery, comprising;

a power sensor operable for:
monitoring an input port for the presence of a load;
connecting the battery to the load in response to detecting the presence of the load at the input port; and
providing an output signal representative of the voltage across a pair of points that includes the input port; and a fan controller operable for:
determining whether the output signal is within a predetermined range; and
activating the fan in response to determining that the output signal is within the predetermined range.

13. The apparatus of claim 12, further comprising a switch driveable by the fan controller for connecting the battery to the load.

14. The apparatus of claim 12, wherein the fan controller is operable for blocking a reverse current from the load in response to detecting a power source across the load.

15. The apparatus of claim 12, wherein the fan controller is operative for dissipating an electrostatic charge across the battery.

16. The apparatus of claim 15, wherein said electrostatic charge protection device is operable for dissipating an electrostatic charge across the load in response to detecting that the load has an electrostatic charge build-up.

17. The apparatus of claim 14, wherein the voltage detector comprises:
a bridge circuit driveable by the load, the bridge circuit operable for driving the switch for connecting the battery to the load; and
a hysteresis voltage driver driveable by the bridge circuit, the hysteresis voltage driver operable for preventing the battery from being disconnected from the load.

18. The apparatus of claim 12, wherein said predetermined range comprises about 4.7 to about 6.5 Volts.

19. The apparatus of claim 12, wherein said predetermined range comprises about 4.7 to about 7.0 Volts.

20. An apparatus for controlling the operation of a fan for a battery, comprising;
means for detecting current supplied by said battery;
said means for detecting current comprising:
means for monitoring an input port for the presence of a load;
means for connecting the battery to the load in response to detecting the presence of the load at the input port; and
means for providing an output signal representative of the current at the input port; and
means for monitoring the voltage of the battery;
said means for monitoring the voltage comprising:
means for determining whether the output signal is within a predetermined range; and
means for activating the fan in response to determining that the output signal is within the predetermined range.

21. An apparatus for controlling the operation of a fan for a battery, comprising;

a power sensor operable for:
detecting a current and voltage associated with a load,
determining whether the current is greater than a first predetermined level,
connecting the battery to the load in response to determining that the current is greater than the first predetermined level, and
providing output signals representative of the voltage across the load and the current associated with the load; and a fan controller operable for:
receiving the output signals from the power sensor;
determining whether the current is greater than a second predetermined current level;
determining whether the voltage is within a predetermined range; and
activating the fan in response to determining that the current is greater than the second predetermined level and the voltage is within the predetermined range.

22. The apparatus of claim 21, wherein the step of activating the fan replenishes an oxygen level within the battery.

23. The apparatus of claim 21, wherein the first predetermined level indicates whether the load is sufficient to activate the operation of the fan controller when the battery is connected to the load.

24. The apparatus of claim 21, wherein the first predetermined level is approximately in the range of 350–500 millamperes.

25. The apparatus of claim 22, wherein the predetermined range comprises:
a first predetermined voltage for indicating that the oxygen level within the battery is depleted; and
a second predetermined voltage for indicating that the oxygen level within the battery is sufficient.

26. The apparatus of claim 21, wherein said predetermined range is approximately 4.7–6.5 volts.

27. The apparatus of claim 21, wherein said predetermined range is approximately 4.7–7.0 volts.

28. The apparatus of claim 21, wherein the second predetermined level indicates whether the load is sufficient for the fan controller to activate the fan when the metal-air battery is connected to the load.

29. The apparatus of claim 21, wherein said second predetermined voltage is approximately in the range 75–300 milliamperes.

30. The apparatus of claim 21, wherein the fan controller turns the fan off when the voltage is greater than the predetermined range or when said current is less than said second predetermined current level.

* * * * *

UNITED STATES PATENT AND TRADEMARK OFFICE
CERTIFICATE OF CORRECTION

PATENT NO. : 6,322,913 B1
DATED : November 27, 2001
INVENTOR(S) : Pedicini et al.

It is certified that error appears in the above-identified patent and that said Letters Patent is hereby corrected as shown below:

Title page,
Item [56], References Cited, U.S. PATENT DOCUMENTS,
Line 7, "4,642,733" should read -- 4,642,273 --;
Line 56, "Bentz et al." should read -- Benz et al. --;
Line 60, "Chieky" should read -- Cheiky --;
Line 66, "Pedecini" should read -- Pedicini --;
Line 68, "Pedicini" should read -- Pedicini et al. --;

Item [56], References Cited, FOREIGN PATENT DOCUMENTS,
Line 1, "(DK)" should read -- (DE) --;
Line 8, "0476848A2" should read -- 0476484A2 --

Column 18,
Line 38, "millamperes" should read -- milliamperes --.

Signed and Sealed this

Ninth Day of April, 2002

Attest:

JAMES E. ROGAN
Attesting Officer
Director of the United States Patent and Trademark Office

UNITED STATES PATENT AND TRADEMARK OFFICE
CERTIFICATE OF CORRECTION

PATENT NO.    : 6,322,913 B2
DATED         : November 27, 2001
INVENTOR(S)   : Pedicini et al.

It is certified that error appears in the above-identified patent and that said Letters Patent is hereby corrected as shown below:

<u>Title page,</u>
Item [56], References Cited, U.S. PATENT DOCUMENTS, insert
-- Page 2, Column 2, --.

Signed and Sealed this

Third Day of December, 2002

JAMES E. ROGAN
*Director of the United States Patent and Trademark Office*